(12) United States Patent
Yano et al.

(10) Patent No.: US 8,604,382 B2
(45) Date of Patent: Dec. 10, 2013

(54) METHOD FOR MANUFACTURING A LASER WELDED STEEL PIPE

(75) Inventors: Koji Yano, Chiba (JP); Kenji Oi, Kawasaki (JP); Masahito Suzuki, Kawasaki (JP); Toshifumi Kodama, Kawasaki (JP); Shigeto Sakashita, Kawasaki (JP)

(73) Assignee: JFE Steel Corporation, Tokyo (JP)

( * ) Notice: Subject to any disclaimer, the term of this patent is extended or adjusted under 35 U.S.C. 154(b) by 378 days.

(21) Appl. No.: 12/999,001

(22) PCT Filed: Jun. 22, 2009

(86) PCT No.: PCT/JP2009/061791
§ 371 (c)(1),
(2), (4) Date: Dec. 14, 2010

(87) PCT Pub. No.: WO2009/157570
PCT Pub. Date: Dec. 30, 2009

(65) Prior Publication Data
US 2011/0100965 A1    May 5, 2011

(30) Foreign Application Priority Data

| Jun. 23, 2008 | (JP) | 2008-162991 |
| Oct. 31, 2008 | (JP) | 2008-281766 |
| Oct. 31, 2008 | (JP) | 2008-281782 |
| Dec. 18, 2008 | (JP) | 2008-321837 |
| Mar. 17, 2009 | (JP) | 2009-064027 |
| Mar. 17, 2009 | (JP) | 2009-064029 |

(51) Int. Cl.
*B23K 26/00* (2006.01)

(52) U.S. Cl.
USPC .................................. 219/121.64; 219/121.7

(58) Field of Classification Search
USPC ........... 219/121.6–121.66, 121.7, 121.76, 50, 219/54, 55, 57, 58, 59.1, 60 R, 60.2, 61, 219/60 A, 76.14, 76.16
See application file for complete search history.

(56) References Cited

U.S. PATENT DOCUMENTS 4,507,540 A * 3/1985 Hamasaki ................ 219/121.64
4,649,256 A * 3/1987 Minamida et al. ....... 219/121.64
(Continued)

FOREIGN PATENT DOCUMENTS

| JP | 06-155059 A | 6/1994 |
| JP | 09-267186 A | 10/1997 |

(Continued)

OTHER PUBLICATIONS

International Search Report dated Oct. 6, 2009, application No. PCT/JP2009/061791.

*Primary Examiner* — Sang Paik
(74) *Attorney, Agent, or Firm* — RatnerPrestia

(57) ABSTRACT

There is provided a method for manufacturing a laser welded steel pipe in which the status of laser welding is accurately assessed, and the assessment is used to modify welding conditions, so that laser welded steel pipes can be manufactured at a high yield rate and in a stable manner. Irradiation point(s) of laser beam(s), with which the longitudinal edges are irradiated from the side of the outer surface, are monitored from the side of the inner surface of an open pipe, and then conditions of welding with the laser beam(s) are assessed to be kept unchanged if any keyhole is found penetrating out of the inner surface of the open pipe, or modified if no keyhole is found penetrating out of the inner surface of the open pipe.

19 Claims, 6 Drawing Sheets

(56) References Cited

U.S. PATENT DOCUMENTS

| | | | | |
|---|---|---|---|---|
| 4,857,697 | A | * | 8/1989 | Melville ................ 219/121.63 |
| 7,236,255 | B2 | * | 6/2007 | Kodama et al. .............. 356/601 |
| 7,693,696 | B2 | * | 4/2010 | Forrest et al. .................... 703/7 |
| 2006/0011592 | A1 | * | 1/2006 | Wang et al. ............. 219/121.64 |
| 2008/0178905 | A1 | * | 7/2008 | Turner et al. ...................... 134/1 |

FOREIGN PATENT DOCUMENTS

| | | |
|---|---|---|
| JP | 10-193148 A | 7/1998 |
| JP | 2001-321974 A | 11/2001 |
| JP | 2006-082129 A | 3/2006 |
| JP | 2008-518785 A | 6/2008 |

\* cited by examiner

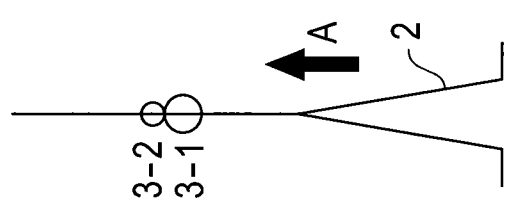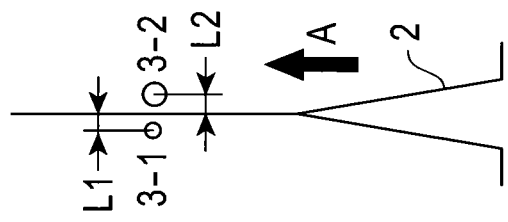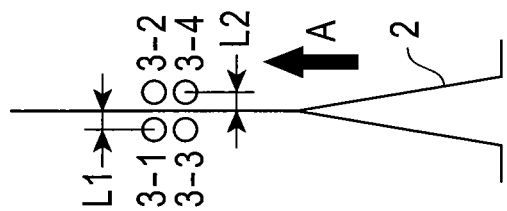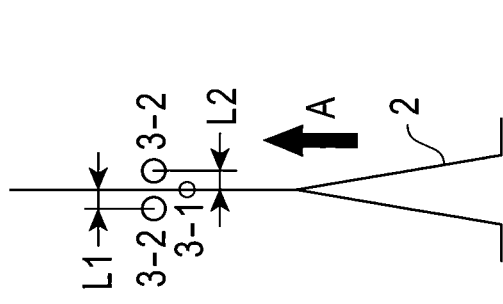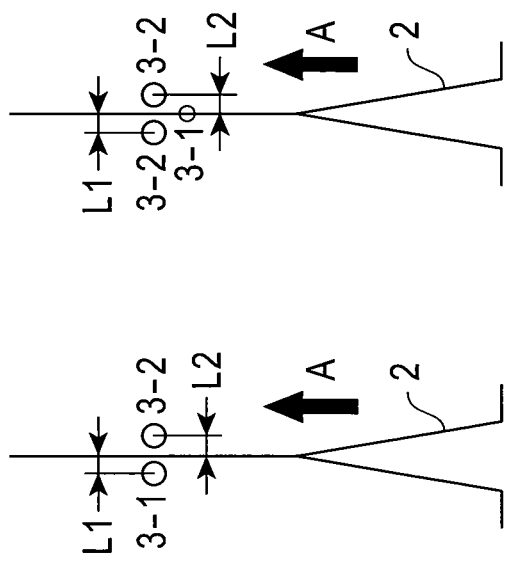

METHOD FOR MANUFACTURING A LASER WELDED STEEL PIPE

FIELD OF THE INVENTION

The present invention relates to methods for manufacturing a steel pipe obtained by welding the longitudinal edges of an open pipe with a laser beam (hereinafter, referred to as a laser welded steel pipe), in particular, a method for manufacturing a laser welded steel pipe suitable for digging and transportation of oil and natural gas, such as oil country tubular goods or a line pipe.

BACKGROUND OF THE INVENTION

Steel pipes known as oil country tubular goods or line pipes fall into two broad categories: welded steel pipes (e.g., electric resistance welded steel pipes and UOE steel pipes) and seamless steel pipes. Of these kinds of steel pipes, electric resistance welded steel pipes can be manufactured at low cost by using a hot rolled steel strip (so-called a hot rolled steel coil) as the raw material and thus are economically advantageous.

However, electric resistance welded steel pipes are usually manufactured by forming steel strips into cylindrical open pipes with forming rolls (here, the open pipes are pipe-like steel strips that are formed using multiple forming rolls and have the edges thereof unwelded; hereinafter, such pipe-like steel strips are referred to as open pipes) and then welding the longitudinal edges of the open pipes (i.e., both edges of each cylindrical steel strip) by electric resistance welding (also referred to as high-frequency resistance welding) while compressing the longitudinal edges using squeeze rolls; thus, electrical resistance welded steel pipes unavoidably have a weld (so-called a seam) and the problem of a deteriorated low-temperature toughness of the seam. Thus, oil country tubular goods and line pipes based on electric resistance welded steel pipes have a problem with the use in cold districts. The reason why the low-temperature toughness of the seam is deteriorated is as follows: When the longitudinal edges are welded, hot molten metal reacts with oxygen in the air to form oxide, and the oxide is likely to remain in the seam.

Electric resistance welded steel pipes have another problem: Alloy elements often segregate in molten metal while the longitudinal edges are being welded, and thus the corrosion resistance of the seam is often deteriorated. Thus, oil country tubular goods and line pipes based on electric resistance welded steel pipes have a problem with the use in the harsh corrosion environment (e.g., the sour environment).

Incidentally, welding with laser beams (hereinafter, referred to as laser welding) has attracted attention as a welding method that does not deteriorate the low-temperature toughness or the corrosion resistance of the seam. With laser welding, the heat source can be small in dimensions, heat energy can converge to a high density, and thus the formation of oxide and the segregation of alloy elements in molten metal can be prevented. Therefore, if laser welding is applied to the manufacturing of welded steel pipes, then the deterioration of the low-temperature toughness and corrosion resistance of the seam can be prevented.

So, the manufacturing process of welded steel pipes has introduced a technology to produce a steel pipe by welding the longitudinal edges of an open pipe under irradiation with a laser beam (i.e., laser welded steel pipes).

In laser welding, however, molten metal is formed in a very narrow area. As a result, the seam of the laser welded steel pipe may have an opening if the contact point of the longitudinal edges of the open pipe, at which the squeeze rolls compress the longitudinal edges (hereinafter, referred to as the contact point or the squeezing point) has a shift from the circumferential position of irradiation with the laser beam; the portion having such an opening should be handled as a welding defect and removed, and this decreases the yield rate of laser welded steel pipes.

As a solution to this, researchers have examined various techniques to monitor the status of irradiation with a laser beam during the manufacturing of a laser welded steel pipe.

For example, Japanese Unexamined Patent Application Publication No. H10-76383 discloses a technique to assess the status of laser welding, in which a laser beam is applied to one side of a steel strip, and a plasma illumination emerging on the other side is monitored. However, the plasma illumination scatters over a wide area, and thus, with this technique, it is difficult to have an accurate understanding of the status of laser welding and impossible to detect any shift of the position of irradiation with the laser beam from the longitudinal edges accurately.

And, Japanese Unexamined Patent Application Publication No. H8-267241 discloses a technique to assess the formation status of penetration beads, in which the emission intensity generated by laser welding is measured. However, the emission intensity greatly varies because of various factors, and thus, with this technique, it is difficult to have an accurate understanding of the formation status of penetration beads.

Japanese Unexamined Patent Application Publication No. 2001-25867 discloses a technique to control welding conditions, in which molten metal formed by arc welding is imaged, and the obtained image is used to analyze the shape of penetration beads. The direct application of this technique for arc welding to laser welding fails to provide a clear image of molten metal. This is because in laser welding, heat energy converges to a high density, and thus an excessive light intensity is generated. As a result, it is difficult in laser welding to have an accurate understanding of the shape of penetration beads.

In addition, Japanese Unexamined Patent Application Publication No. 2001-25867 discloses a technique of irradiating molten metal with a laser beam through an interference filter; however, this laser beam is used to image molten metal and thus has no contribution to welding.

The present invention is intended to provide a method for manufacturing a laser welded steel pipe at a high yield rate and in a stable manner, in which the status of laser welding is accurately assessed during manufacturing of the laser welded steel pipe, and the assessment is used to modify welding conditions.

SUMMARY OF THE INVENTION

More specifically, the present invention provides the following:

1. A method for manufacturing a laser welded steel pipe in which a steel strip is formed into a cylindrical open pipe and then the longitudinal edges of the open pipe are welded by irradiating the outer surface of the open pipe with a laser beam while compressing the longitudinal edges of the open pipe with squeeze rolls, including a step of monitoring the irradiation point of the laser beam, with which the longitudinal edges are irradiated, from the side of the inner surface of the open pipe, and an assessment step in which the conditions of welding with the laser beam are kept unchanged if a keyhole is found penetrating out of the inner surface of the open pipe, or modified if no keyhole is found penetrating out of the inner surface of the open pipe, so that welding can be performed with a keyhole penetrating from the outer surface to the inner surface of the open pipe captured at the irradiation point of the laser beam.

In the method for manufacturing a laser welded steel pipe according to the present invention, the size of the keyhole measured on the side of the inner surface of the open pipe is preferably equal to or greater than 0.2 mm in diameter. And, the contact point of the longitudinal edges, at which the squeeze rolls compress the longitudinal edges, is preferably located in molten metal formed by irradiation with the laser beam. Otherwise, the contact point of the longitudinal edges, at which the squeeze rolls compress the longitudinal edges, is preferably located in the keyhole.

2. The method for manufacturing a laser welded steel pipe according to 1 above, wherein an auxiliary heat source for heating from the side of the outer surface is so used that the longitudinal edges can be heated and molten, and the heated portion is emitted by laser beam.

3. The method for manufacturing a laser welded steel pipe according to 2 above, wherein the auxiliary heat source is an arc.

4. The method for manufacturing a laser welded steel pipe according to 1 to 3 above, further including, besides the step of monitoring the irradiation point of the laser beam, with which the longitudinal edges are irradiated, from the side of the inner surface of the open pipe, a step of measuring a ray of reflected light and a plasma illumination both generated from the irradiation point by irradiation with the laser beam using sensors, wherein the assessment step is thus as follows: With the status of welding monitored on the basis of the individual measurements provided by the sensors, the conditions of welding with the laser beam are kept unchanged if a keyhole is found penetrating out of the inner surface of the open pipe and if fluctuations on a relative value basis of the measurement for the ray of reflected light and that for the plasma illumination are small, or modified if a keyhole is found penetrating out of the inner surface of the open pipe, instable, and repeatedly closing and if fluctuations on a relative value basis of the measurement for the ray of reflected light and that for the plasma illumination are large, so that welding can be performed with a keyhole penetrating from the outer surface to the inner surface of the open pipe at the irradiation point of the laser beam. Note that here the reflected light mentioned above is also referred to as feedback light.

5. The method for manufacturing a laser welded steel pipe according to 1 to 4 above, wherein the size of the keyhole measured on the side of the inner surface of the open pipe is equal to or greater than 0.2 mm in diameter.

6. The method for manufacturing a laser welded steel pipe according to 1 to 5 above, wherein the contact point of the longitudinal edges, at which the squeeze rolls compress the longitudinal edges, is located in molten metal formed by irradiation with the laser beam.

7. The method for manufacturing a laser welded steel pipe according to 1 to 5 above, wherein the contact point of the longitudinal edges, at which the squeeze rolls compress the longitudinal edges, is located in the keyhole.

8. The method for manufacturing a laser welded steel pipe according to 2 to 7 above, wherein an oscillator of the laser beam and the auxiliary heat source are placed in integration.

9. The method for manufacturing a laser welded steel pipe according to 2 to 7 above, wherein an oscillator of the laser beam and the auxiliary heat source are placed in integration, and the auxiliary heat source heats the longitudinal edges before the laser beam does.

10. The method for manufacturing a laser welded steel pipe according to 3 to 9 above, wherein the oscillator of the laser beam is a fiber laser oscillator offering a laser power of higher than 15 kW and a laser focusing length equal to or longer than 200 mm.

11. The method for manufacturing a laser welded steel pipe according to any of 3 to 10 above, wherein the distance between the irradiation point of the laser beam and the electrode of the arc measured on the outer surface of the open pipe is equal to or shorter than 7 mm.

12. The method for manufacturing a laser welded steel pipe according to 4 to 10 above, wherein the ray of reflected light is measured from the side of the outer surface of the open pipe, whereas the plasma illumination is measured from the side of the inner surface of the open pipe.

13. The method for manufacturing a laser welded steel pipe according to 1 above, wherein the laser beam is a plurality of laser beams, and welding is performed with keyholes penetrating from the outer surface to the inner surface of the open pipe individually at the irradiation points of the laser beams.

14. The method for manufacturing a laser welded steel pipe according to 13 above, further including, besides the step of monitoring the irradiation points of the laser beams, with which the longitudinal edges are irradiated, from the side of the inner surface, a step of measuring rays of reflected light and plasma illuminations both generated from the irradiation points by irradiation with the laser beams using sensors, wherein the assessment step is thus as follows: With the status of welding monitored on the basis of the individual measurements provided by the sensors, the conditions of welding with the laser beams are kept unchanged if a plurality of keyholes are found penetrating out of the inner surface of the open pipe and if fluctuation on a relative value basis of the measurements for the rays of reflected light and those for the plasma illuminations are small, or modified if any keyhole is found penetrating out of the inner surface of the open pipe, instable, and repeatedly closing and if fluctuation on a relative value basis of the measurements for the rays of reflected light and those for the plasma illuminations are large, so that welding can be performed with any keyhole penetrating from the outer surface to the inner surface of the open pipe at any of the irradiation points of the laser beams.

15. The method for manufacturing a laser welded steel pipe according to 13 or 14 above, wherein the contact point of the longitudinal edges is located between two of the keyholes that are located across the longitudinal edges and whose distances to the longitudinal edges in the direction perpendicular to the longitudinal edges are longer than that of any other one of the keyholes.

16. The method for manufacturing a laser welded steel pipe according to 13 to 15 above, wherein the sizes of the keyholes measured on the side of the inner surface of the open pipe are all equal to or greater than 0.1 mm in diameter.

17. The method for manufacturing a laser welded steel pipe according to 13 to 16 above, wherein the contact point of the longitudinal edges is located in molten metal formed by irradiation with the laser beams.

18. The method for manufacturing a laser welded steel pipe according to 13 to 17 above, wherein the laser beams are two laser beams.

19. The method for manufacturing a laser welded steel pipe according to 13 to 18 above, wherein an auxiliary heat source for heating from the side of the outer surface of the open pipe is so used that the longitudinal edges can be further heated and molten.

With the present invention, the status of laser welding can be accurately assessed during the manufacturing of laser welded steel pipes, and the assessment can be used to modify welding conditions so that the contact point of the longitudinal edges can be always located in keyhole(s) or molten metal formed by irradiation with laser beam(s). As a result, laser welded steel pipes can be manufactured at a high yield rate and in a stable manner. The obtained laser welded steel pipes are excellent in terms of the low-temperature toughness and the corrosion resistance of the seam thereof and thus can be suitable for the use as oil country tubular goods or line pipes that are used in cold districts or the corrosion environment.

BRIEF DESCRIPTION OF THE DRAWINGS

FIGS. 2A to 2E are plan views of the irradiation points of a plurality of laser beams.

REFERENCE NUMERALS

1: open pipe; 2: longitudinal edge; 3, 3-1, 3-2, 3-3, and 3-4: laser beam; 4: keyhole; 5: molten metal; 6: seam; 7: mandrel bar; 8: monitoring camera; 9: illuminating device; 10: plasma illumination sensor; 11: image processor; 12: assessment device; 13: position controller; 14: welding head; 15: reflected-light sensor; 16: monitoring device; 17: monitoring device; 18: electrode; 19: arc; 20: welding current; 21: Lorentz force

DETAILED DESCRIPTION OF THE INVENTION

Figure 1A:
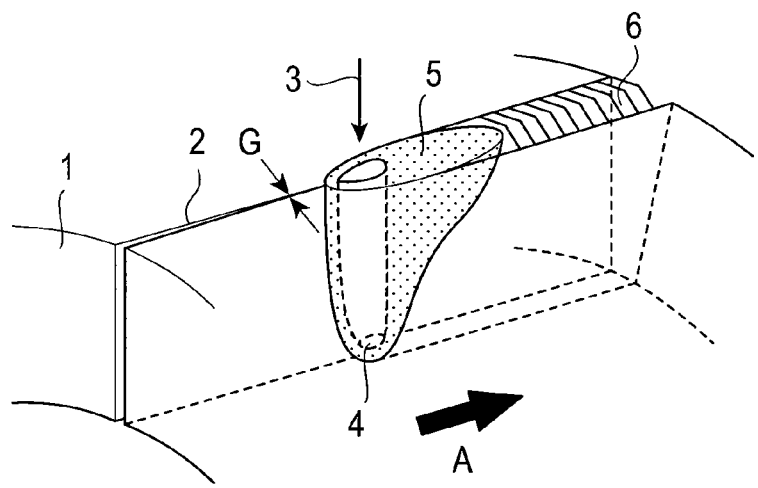
FIG. 1A is an oblique perspective diagram schematically illustrating an example of welding at the contact point of the longitudinal edges of an open pipe according to an embodiment of the present invention.
Figure 1B:
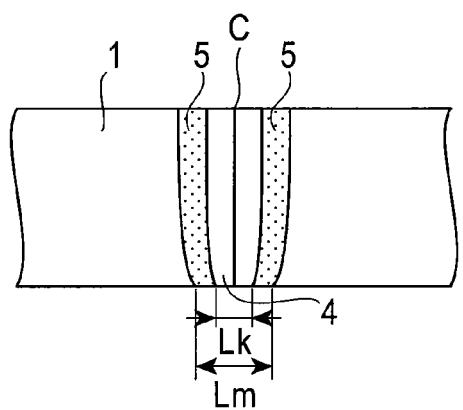
FIGS. 1B and 1C are perspective diagrams derived from FIG. 1A, illustrating a keyhole 4 and molten metal 5 formed around it on a cross-section taken in the circumferential direction of the pipe (in the direction perpendicular to the welding line).
Figure 1C:
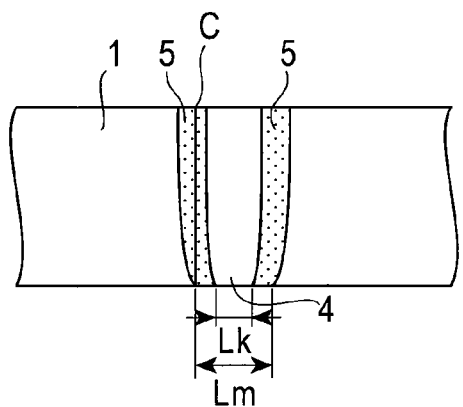

For the manufacturing of laser welded steel pipes by applying laser welding to the longitudinal edges of open pipes, the inventors studied and discussed techniques to monitor the status of laser welding. FIG. 1A is an oblique perspective diagram schematically illustrating an example of welding at the contact point of the longitudinal edges 2 of an open pipe 1 according to an embodiment of the present invention. Arrow A in FIG. 1A represents the direction of travel of the open pipe. Note that a keyhole 4 and molten metal 5 formed around it, both generated by irradiation with a laser beam 3, are shown in perspective diagrams. The inventors focused on the point that upon irradiation with the laser beam 3, the longitudinal edges 2 are molten by heat energy converging to a high density, generated molten metal evaporates, and thus the evaporating pressure and the reaction force to evaporation form a deep cavity 4 (hereinafter, referred to as a keyhole 4) in molten metal 5, as shown in FIG. 1A. It is considered that the inside of the keyhole 4 is invaded by the laser beam 3 and filled with hot plasma generated by the ionization of metal vapor caused by the energy of the laser beam 3. Note that FIGS. 1B and 1C are perspective diagrams derived from FIG. 1A, illustrating the keyhole 4 and molten metal 5 formed around it on a cross-section taken in the circumferential direction of the pipe (in the direction perpendicular to the welding line).

This keyhole 4 indicates the point at which the heat energy of the laser beam 3 converges to the highest density. Thus, a laser welded steel pipe can be manufactured in a stable manner by monitoring the keyhole 4 and, as shown in FIG. 1B, performing laser welding in such a manner that the contact point C of the longitudinal edges can be located in the keyhole 4. However, matching the contact point C of the longitudinal edges 2 to the keyhole 4 requires a high-accuracy position control technique. To solve this, laser welding may be so performed that the contact point C of the longitudinal edges 2 can be located in molten metal 5, which is formed around the keyhole 4. Molten metal 5 has a length Lm in the circumferential direction of the pipe (in the direction perpendicular to the welding line) greater than the size of the keyhole 4, Lk, and thus the irradiation point of the laser beam can be easily controlled in the circumferential direction of the pipe by relatively easy techniques, which are based on the positional control of a welding head 14, and a converging lens or a converging mirror housed in the welding head 14; in this way, the laser welded steel pipe can be manufactured in a stable manner. Note that the contact point C of the longitudinal edges 2 may be any point on the direction of travel A of the open pipe 1 as long as at that point the mean gap width G of the longitudinal edges 2 measured in the thickness direction has been reduced to 0.5 mm or smaller by squeeze rolls.

Furthermore, when stable laser welding is in progress, the keyhole 4 penetrates from the outer surface to the inner surface of molten metal 5 and can be monitored accurately.

The present invention was made on the basis of these findings.

Figure 3:
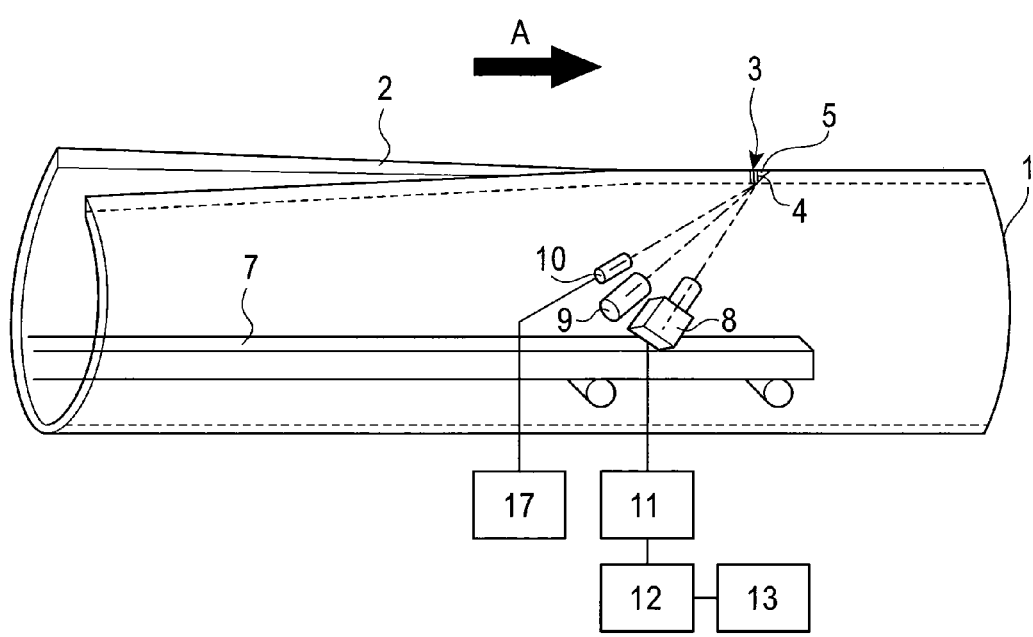
FIG. 3 is an illustration of embodiments of a keyhole diameter measuring device and a plasma illumination measuring device.

The open pipe 1 shown in FIG. 1A is obtained by forming a steel strip into a cylinder with forming rolls. With the longitudinal edges 2 of this open pipe 1 compressed with squeeze rolls (not shown in the drawing), the open pipe 1 is irradiated with the laser beam 3 from the side of the outer surface thereof. At the same time, the irradiation point of the laser beam 3 is monitored from the side of the inner surface of the open pipe 1 for detection of the keyhole 4. The keyhole 4 can be easily detected by ordinary image processing techniques as long as it can penetrate from the outer surface to the inner surface of the open pipe 1. The keyhole 4 detected on the side of the inner surface would mean that stable laser welding is in progress; in this case, welding conditions are kept unchanged. Note that FIG. 1A shows no monitoring device for the keyhole 4 therein; the keyhole monitoring device used in embodiments of the present invention is shown in FIG. 3.

The keyhole 4 not found would mean that the keyhole 4 is closed; in this case, welding conditions should be modified and so adjusted that stable laser welding can progress. And, if the keyhole 4 can be detected under the modified welding conditions, then laser welding is performed with these welding conditions maintained. Note that the keyhole 4 is the most likely to be closed when the contact point C of the longitudinal edges 2 deviates out of the keyhole 4 or from molten metal 5, which is formed around the keyhole 4. The reason for this is because when the contact point C is irradiated with the laser beam 3, it is easy for the laser beam to travel efficiently in the gap of the contact point C in the thickness direction, and thus the keyhole is likely to form; however, when any point other than the contact point C is irradiated with the laser beam 3, it is needed that molten metal evaporates from the surface of the steel strip so that the evaporating pressure and the reaction force to evaporation can form a deep cavity 4 in molten metal 5, laser power of a higher output is required, and thus the keyhole 4 becomes more likely to be closed.

Specific welding conditions reached by adjustment when the keyhole 4 is closed are the most preferably ones under which the irradiation point of the laser beam is moved in the circumferential direction of the open pipe 1 so that the contact point C of the longitudinal edges 2 can be located at the irradiation point of the laser beam 3 (the keyhole 4) or in molten metal 5. For example, it is preferable that the contact point of the longitudinal edges 2 as well as the positions of the keyhole 4 and molten metal 5 are subjected to image processing based on a keyhole monitoring device and thus recognized, the circumferential direction and the distance of travel of the open pipe are calculated, and then the irradiation point of the laser beam 3 is moved by controlling the positions of the welding head 14 and a converging lens or a converging mirror housed in the welding head 14 so that the contact point C of the longitudinal edges 2 can be located in the keyhole 4 or molten metal 5.

As for other welding conditions, it is also preferable to take actions such as controlling the focusing point of the laser beam, moving the irradiation point of the beam in the longitudinal direction of the open pipe, up-regulating the laser power, and/or down-regulating the welding speed.

Such an adjustment of the positional relationship between the contact point of the longitudinal edges 2 and the keyhole 4 or molten metal 5 can be easily achieved by monitoring the open pipe 1 from the side of the inner surface thereof to detect the keyhole 4.

When the size of the keyhole 4 measured on the side of the inner surface is smaller than 0.2 mm in diameter, the keyhole 4 may possibly be in a closed state. Thus, the keyhole 4 preferably has a diameter equal to or greater than 0.2 mm on the side of the inner surface. However, when the diameter measured on the side of the inner surface exceeds 1.0 mm, not only welding defects such as burn-through occur, but also the width of the weld left after molten metal is solidified (i.e., the seam 6) is significantly expanded, thereby disfiguring the laser welded steel pipe. Thus, the diameter of the keyhole 4 measured on the side of the inner surface of the open pipe 1 is more preferably in the range of 0.2 to 1.0 mm. When the shape of the keyhole is ellipsoidal, the minor axis is preferably equal to or longer than 0.2 mm. Note that the size of the keyhole 4 was monitored from the inside of the open pipe 1 using a monitoring camera 8 fastened on a mandrel bar 7 suspended between stands, as shown in FIG. 3. Imaging conditions were as follows: the inner surface of the open pipe 1 was irradiated by an illuminating device 9 with a ray of light having a wavelength component different from those of the laser beam and the plasma illumination used, for example, an ultraviolet ray having a wavelength of 337 nm, and imaged through a filter that allows only rays of light having this wavelength to pass through, so that any disturbance due to infrared light, plasma illuminations, or other kinds of light coming from the keyhole 4 or molten metal 5 could be prevented. Here, the wavelength allowed to pass through the filter is chosen depending on the spectrum of the plasma light emission, to have a band of wavelength different from this spectrum, with available light sources and filters also taken into account. The camera speed was set at 30 frames per second, and the mean value thereof was calculated using five still images randomly sampled. In addition, the shape of the keyhole on the side of the inner surface was almost perfectly circular or ellipsoidal; when the shape of the keyhole was ellipsoidal, the minor axis was measured. Additionally, an image processor 11, which processes a video shot by the monitoring camera 8 to form the images of the contact point C of the longitudinal edges 2, the keyhole 4, and molten metal 5 and then digitizes the dimensions and positions of them, as well as an assessment device 12 and a position controller 13 for the laser beam were used to judge whether the keyhole 4 was closed and control the irradiation point of the laser beam. Note that the monitoring device for the keyhole 4 is never limited to the constitution described above; it may have any other possible constitution.

Figure 4:
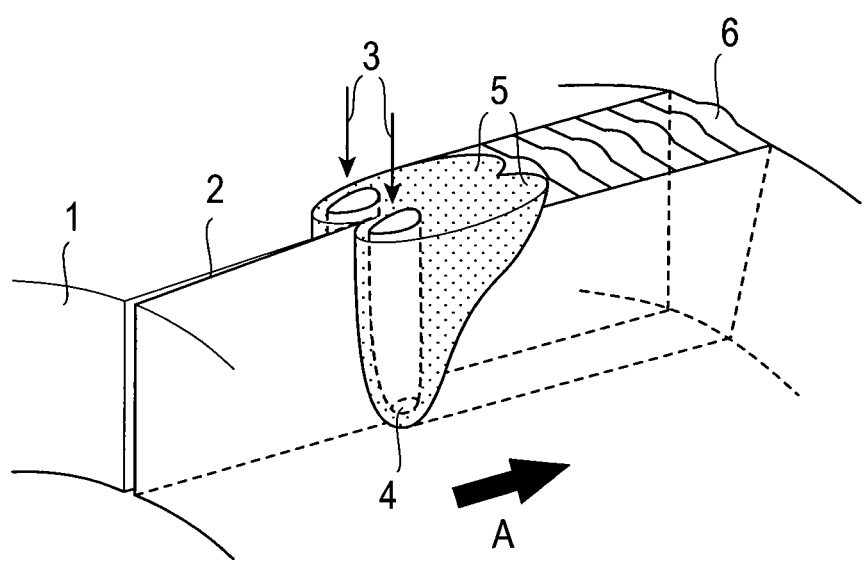
FIG. 4 is an oblique perspective diagram schematically illustrating an example of welding at the contact point of the longitudinal edges of an open pipe using laser beams arranged as shown in FIG. 2A.

When two or more laser beams 3 are used, such an arrangement for irradiation with a plurality of laser beams as shown in FIGS. 2A to 2E is possible. FIGS. 2A to 2E are plan views of an open pipe with the irradiation points of a plurality of laser beams. Arrow A in each drawing represents the direction of travel of the open pipe. FIG. 2A shows an arrangement for irradiation with two laser beams, illustrating an example in which laser beams 3-1 and 3-2 are arranged across the longitudinal edges. FIG. 4 is an oblique perspective diagram schematically illustrating an example of welding at the contact point of the longitudinal edges of an open pipe using laser beams arranged as shown in FIG. 2A. Arrow A in FIG. 4 represents the direction of travel of the open pipe. Note that keyholes 4 and molten metal 5 formed around them, both generated by irradiation with the two laser beams 3, are shown in perspective diagrams. FIG. 2B shows an arrangement for irradiation with three laser beams and is an example in which a laser beam 3-1 heats the longitudinal edges first and then laser beams 3-2 and 3-3 are arranged across the longitudinal edges. FIG. 2C shows an arrangement for irradiation with four laser beams and is an example in which four laser beams 3-1, 3-2, 3-3, and 3-4 are arranged pairwise across the longitudinal edges. FIG. 2D shows an arrangement for irradiation with two laser beams and is an example in which laser beams 3-1 and 3-2 having different laser power levels are arranged across the longitudinal edges. This is an example of arrangement in which the power of the laser beam 3-1 is smaller than that of the laser beam 3-2, and thus the laser beam 3-1 is closer to the longitudinal edges. FIG. 2E shows an arrangement for irradiation with two laser beams and is an example in which two laser beams 3-1 and 3-2 are longitudinally aligned (in tandem) along the longitudinal edges. In this example, the laser beams are handled not as a plurality of laser beams but as a single laser beam. In monitoring of keyholes, all to be monitored is the keyhole formed by the laser beam 3-2, which is the closest to molten metal. Three or more laser beams longitudinally aligned (in tandem) along the longitudinal edges would also be handled as a single laser beam. In monitoring of keyholes, all to be monitored is also the keyhole that is the closest to molten metal.

When a plurality of laser beams are used, the arrangement of the irradiation points of the laser beams is never limited to the examples shown in FIGS. 2A to 2E; they can be freely arranged for specific purposes. However, the number of laser beams used in the present invention is preferably in the range of one to four. Five or more laser beams would be disadvantageous because of equipment cost, manufacturing cost, and a complicated positional control of the laser beams.

In embodiments of the present invention, a plurality of keyholes 4 are all monitored, and laser welding is so performed that the contact point of the longitudinal edges 2 can be located between the two keyholes that are located across the longitudinal edges 2 and whose distances to the longitudinal edges 2 in the direction perpendicular to the longitudinal edges (L1 and L2) are longer than that of any other keyhole, as shown in FIGS. 2A to 2E. However, positioning the contact point of the longitudinal edges 2 at this definite point requires a high-accuracy control technique. To solve this, laser welding may be so performed that the contact point of the longitudinal edges 2 can be controlled to be located in molten metal 5, which is formed around the two keyholes 4. Molten metal 5 has a length Lm in the circumferential direction of the pipe (in the direction perpendicular to the welding line) greater than the size of each keyhole 4, Lk, and thus relatively easy techniques can be used for control.

Such an adjustment of the positional relationship between the contact point of the longitudinal edges 2 and two keyholes 4 or molten metal 5 formed between these two keyholes 4 can be easily performed by monitoring the open pipe 1 from the side of the inner surface thereof to detect the keyholes 4. Note that when welding is performed while the irradiation with a plurality of laser beams is being performed to form penetrating keyholes, the number of molten pools is often one. When the number of molten pools is one as above, keyholes 4 all having a size of less than 0.1 mm on the side of the inner surface would possibly lead to a closed state of any of the keyholes 4. Thus, the keyholes 4 preferably have diameters equal to or greater than 0.1 mm on the side of the inner surface. However, when the diameter measured on the side of the inner surface exceeds 1.0 mm, not only welding defects such as burn-through occur, but also the width of the weld left after molten metal is solidified (i.e., the seam 6) is significantly expanded, thereby disfiguring the laser welded steel pipe. Thus, the diameters of the keyholes 4 measured on the side of the inner surface of the open pipe 1 are more preferably in the range of 0.1 to 1.0 mm. When the shape of the keyholes is ellipsoidal, the minor axes are preferably equal to or longer than 0.1 mm.

In addition, in such an example as shown in FIG. 2E, in which two laser beams 3-1 and 3-2 are longitudinally aligned (in tandem) along the longitudinal edges, the laser beams are handled not as a plurality of laser beams but as a single laser beam, and thus all to be monitored is the keyhole formed by the laser beam 3-2, which is the closest to molten metal 5; so, the keyhole 4 preferably has a diameter equal to or greater than 0.2 mm on the side of the inner surface.

Incidentally, any closed state of the keyhole 4 would affect the manufacturing of the laser welded steel pipe even if it lasts only for a short period of time. For example, a closed state lasting for 0.01 seconds or longer in laser welding progressing at a welding speed exceeding 5 m/min would cause welding defects due to many spatters, such as insufficient melting and undercutting, thereby leading to a decreased yield rate of laser welded steel pipes. Such a closed state of any keyhole disappearing in a short period of time is difficult to detect only by monitoring the keyhole in the above-described manner. To solve this, the status of the keyhole is analyzed by, besides the monitoring of the keyhole, measuring a ray of reflected light and a plasma illumination both generated from the irradiation point of the laser beam using sensors, and the status of welding is monitored on the basis of the relative values of the measurement obtained for the ray of reflected light and that for plasma illumination.

The ray of reflected light generated from the irradiation point of the laser beam is preferably measured from the side of the outer surface of the open pipe 1. The reason for this is because it allows the intensity of reflected light to be measured accurately even when a short-time closed state of the keyhole occurs.

And, the plasma illumination generated from the irradiation point of the laser beam is preferably measured from the side of the inner surface of the open pipe 1. The reason for this is because on the side of the outer surface of the open pipe 1, plasma illuminations generated by the laser excitation of shielding gas and fumes cause disturbance, leading to a decreased measurement accuracy; however, measuring the plasma illumination from the side of the inner surface would be free from plasma generation on the side of the inner surface when a short-time closed state of the keyhole 4 occurs, thereby ensuring that the presence or absence of any closed state of the keyhole 4 can be determined accurately.

In addition, when a plurality of laser beams are used, rays of reflected light generated from all of the irradiation points of the laser beams are monitored; however, the irradiation points are close to each other, and thus only one monitoring device that can see the whole area in which the irradiation positions are distributed is needed for monitoring.

Small fluctuations on a relative value basis of the measurement (e.g., intensity) for the ray of reflected light and that for the plasma illumination, both of which are generated by irradiation with the laser beam, indicate that the keyhole 4 penetrates from the outer surface to the inner surface; in this case, welding conditions are kept unchanged. Large fluctuations on a relative value basis indicate that the keyhole 4 does not penetrate from the outer surface to the inner surface; in this case, welding conditions are modified and so adjusted that stable laser welding can progress.

Figure 5:
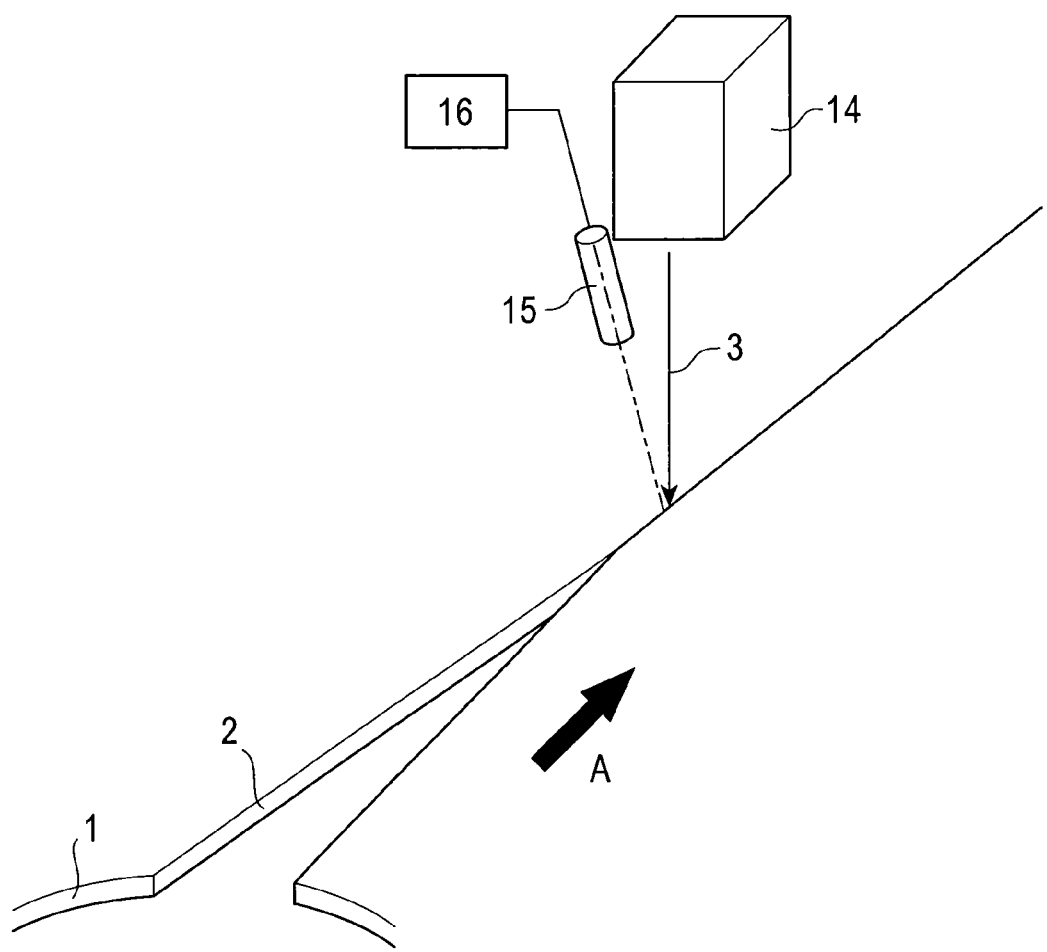
FIG. 5 is an illustration of an embodiment of a reflected-light measuring device.

Note that in measuring the ray of reflected light generated by irradiation with the laser beam, the ray of reflected light was monitored from the outside of the open pipe 1 using a reflected-light sensor 15, which was suspended from a welding head 14, and a monitoring device 16, as shown in FIG. 5. Conditions for data collection were as follows: Measurement was performed with the reflected-light sensor 15 equipped with a filter that allowed only rays of light having the same wavelength as laser to pass through, so that any disturbance due to infrared light coming from the keyhole 4 or molten metal 5 could be prevented. Fluctuations in the intensity of the reflected light were assessed using the monitoring device 16. For example, a photodiode or other similar devices can be used as the reflected-light sensor. In addition, rays of reflected light coaxial with laser light can be measured by delivering it to the reflected-light sensor using a mirror housed in the welding head or by some other means.

As for the measurement of the plasma illumination, measurement was performed with a plasma illumination sensor 10 installed along with the monitoring device for the keyhole, as shown in FIG. 3. Conditions for data collection were as follows: Measurement was performed with the plasma illumination sensor 10 equipped with a filter that allowed only the wavelength of the laser-generated plasma illumination, so that any disturbance due to infrared light coming from the keyhole 4 or molten metal 5 could be prevented. Fluctuations in the intensity of the plasma illumination were assessed using the monitoring device 17. Examples of the plasma illumination sensor include Si-device element-based one for the range of 300 to 900 nm.

The rate of data collection was 1 kHz in frequency. When fluctuations in the intensity of the ray of reflected light and/or the plasma illumination exceed 15% on a relative value basis, an alarm is given, and welding conditions are modified and so adjusted that stable laser welding can progress. Note that the monitoring devices for the ray of reflected light and the plasma illumination generated by irradiation with the laser beam may have any constitution; they are never limited to the constitutions described above.

Specific welding conditions reached by adjustment when fluctuations in the intensity of the ray of reflected light and/or the plasma illumination exceed 15% on a relative value basis are the same as those reached by adjustment when the keyhole 4 is closed. This means that when fluctuations in the intensity of the ray of reflected light and/or the plasma illumination exceed 15% on a relative value basis, welding conditions are the most preferably adjusted in the following manner: The irradiation point of the laser beam is moved in the circumferential direction of the open pipe 1 so that the contact point of the longitudinal edges 2 can be located at the irradiation point of the laser beam 3 (the keyhole 4) or in molten metal 5. For example, it is preferable that the contact point of the longitudinal edges 2 as well as the positions of the keyhole 4 and molten metal are subjected to image processing based on a keyhole monitoring device and thus recognized, the circumferential direction and the distance of travel of the open pipe are calculated, and then the irradiation point of the laser beam is moved by controlling the positions of the welding head 14 and a converging lens or a converging mirror housed in the welding head 14 so that the contact point 2 of the longitudinal edges 2 can be located in the keyhole 4 or molten metal 5.

Note that the devices for measuring the ray of reflected light and the plasma illumination generated by irradiation with the laser beam are never limited to the constitutions described above and may have any constitution.

As for other welding conditions, it is also preferable to take actions such as controlling the focusing point of the laser beam, moving the irradiation point of the beam in the longitudinal direction of the open pipe, up-regulating the laser power, and/or down-regulating the welding speed.

The oscillator of the laser beam used in the present invention may be any of various forms of oscillators. Gas lasers, in which a gas (e.g., $CO_2$ (carbon dioxide gas), helium-neon, argon, nitrogen, or iodine (I)) is used as a medium, solid lasers, in which a solid (e.g., YAG doped with a rare earth element) is used as a medium, fiber lasers, in which fiber is used as the laser medium instead of bulk, and some other lasers are suitable; otherwise, a semiconductor laser may be used.

However, in the present invention, it is the most preferable that the laser power exceeds 15 kW (the power of a single laser or the total power of several lasers) and that the laser focusing length is equal to or longer than 200 mm. Any laser power of a single laser or any total laser power of several lasers not higher than 15 kW would result in a welding speed of lower than 5 m/min, thereby posing the problem of the frequent occurrence of blowholes. Any laser focusing length shorter than 200 mm would pose the problem of unstable welding due to shifts of the longitudinal edges of the open pipe, which is formed from a steel strip, in the direction of the Z-axis (in the direction of the optical axis of the laser beam).

The open pipe may be heated from the outer surface thereof using an auxiliary heat source. The constitution of the auxiliary heat source is not particularly limited as long as it allows the outer surface of the open pipe to be heated and molten. For example, means based on the burner melting method, the plasma melting method, the TIG (Tungsten Inert Gas) melting method, the electron beam melting method, the laser beam melting method, or some other possible melting method are suitable.

In addition, the auxiliary heat source is preferably placed in integration with the laser beam. The reason for this is because when the auxiliary heat and the laser are placed separately, a great amount of heat is required to obtain the effect of the auxiliary heat, and welding defects (e.g., undercutting) are very difficult to prevent. More preferably, the auxiliary heat is placed in the position preceding the laser beam. The reason for this is because it allows for the removal of moisture and oil content from the longitudinal edges.

Figure 6:
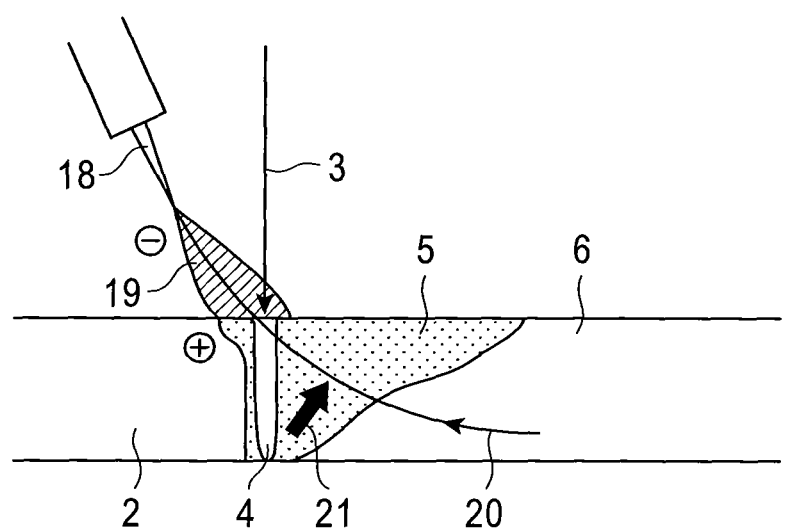
FIG. 6 is a diagram illustrating an embodiment of a method for preventing molten metal burn-through using an arc.

An arc is preferably used as a more preferable auxiliary heat source. The source of the arc is one that can produce the electromagnetic force (i.e., the electromagnetic force generated from the magnetic field of the welding current) acting in the direction to prevent burn-through of molten metal. For example, the TIG welding method, the plasma arc welding method, and other similar known techniques can be used. More specifically, as shown in FIG. 6, the electrode 18 is used as the negative electrode, and the longitudinal edges 2 of the open pipe 1 are used as the positive electrode; Lorentz force 21, under which molten metal 5 condenses around the arc 19 in accordance with Fleming's left-hand rule, can be used, and thus burn-through of molten metal 5 can be prevented. In addition, the arc is preferably placed in integration with the laser beam. The reason for this is because, as described above, it makes possible to effectively give the effect of the magnetic field emerging around the welding current 20, which generates the arc 19, to molten metal 5, which is formed by the laser beam. More preferably, the source of the arc is placed in the position preceding the laser beam 3. The reason for this is because it allows for the removal of moisture and oil content from the longitudinal edges 2.

And, the distance between the irradiation point of the laser beam 3 and the electrode 18 of the arc measured on the outer surface of the open pipe 1 is preferably equal to or shorter than 7 mm. The reason for this is because when the distance between the irradiation point of the laser beam 3 and the electrode 18 of the arc exceeds 7 mm, the amount of molten metal 5 molten by the arc 19 is small, and thus the effect of the magnetic field emerging around the welding current 20 is small.

In the present invention, even an open pipe 1 made of a thick material (e.g., one having a thickness of equal to or greater than 4 mm) can be welded using laser without preheating of the longitudinal edges 2 by high-frequency heating or some other means. However, preheating of the longitudinal edges 2 by high-frequency heating or some other means would be advantageous by improving the productivity of laser welded steel pipes and giving some other benefits.

As described above, with the present invention, the status of laser welding can be accurately assessed during the manufacturing of laser welded steel pipes, and the assessment can be used to modify welding conditions so that the contact point of the longitudinal edges can be always located in keyhole(s) or molten metal formed by irradiation with laser beam(s). As a result, laser welded steel pipes can be manufactured at a high yield rate and in a stable manner. Taking advantage of laser welding, the obtained laser welded steel pipes are excellent in terms of the low-temperature toughness and the corrosion resistance of the seam thereof, and thus can be suitable for the use as oil country tubular goods or line pipes that are used in cold districts or the corrosion environment.

Example 1

Laser welded steel pipes were manufactured by forming steel strips into cylindrical open pipes with forming rolls and then irradiating each open pipe with a laser beam from the side of the outer surface while compressing the longitudinal edges of the open pipe using squeeze rolls. Components of the steel strips were as shown in Table 1.

In laser welding, a 25-kW $CO_2$ laser oscillator was used, the power and welding speed of which were as shown in Table 2.

A monitoring device for the keyhole 4 was a monitoring camera 8 attached using the device shown in FIG. 3 to the mandrel bar 7 of a device for cutting inner beads, and was inserted into each open pipe 1. Note that the plasma illumination sensor 10 and the monitoring device 17 for it were not used, although shown in FIG. 3. The monitoring camera 8 was a camera that could visualize the predefined wavelength (i.e., 337 nm) only, in order to prevent disturbance due to light such as plasma illuminations generated by irradiation with the laser beam 3.

The examples of the present invention shown in Table 2 (Welded Steel Pipe Nos. 1 to 4) are examples in which a keyhole 4 was monitored from the side of the inner surface of the open pipe 1, the size of the keyhole 4 was adjusted as shown in Table 2, and the positional relationship between the contact point of the longitudinal edges and the keyhole 4 or molten metal 5 was adjusted as shown in Table 2. Adjustment was made in such a manner that when the keyhole diameter was smaller than 0.2 mm, the irradiation point of the laser beam was moved in the circumferential direction of the open pipe 1 so that the contact point C of the longitudinal edges 2 could be located at the irradiation point of the laser beam 3 (the keyhole 4) or in molten metal 5.

Welded Steel Pipe Nos. 5 and 6, which are comparative examples, are examples in which the monitoring of the keyhole 4 was omitted. Also, Welded Steel Pipe Nos. 7 and 8, which are comparative examples, are examples in which only the monitoring of the keyhole 4 was performed, and the size and the positional relationship of the keyhole 4 were not adjusted.

The obtained laser welded steel pipes were subjected to ultrasonic examination, in which the seam was examined over 20 m of its length in accordance with JIS Standard G0582. Results of the examination are shown in Table 2. Note that in Table 2, defects were evaluated on the basis of the peak indicated height relative to the standard artificial defect, an N5 notch on the inner and outer surfaces, in accordance with the following criteria: the relative peak indicated height was equal to or lower than 10%—A: Excellent (⊙); higher than 10% but not higher than 25%—B: Good (○); higher than 25% but not higher than 50%—C: Acceptable (Δ); higher than 50%—D: Not acceptable (x).

The laser welded steel pipes indicated as Steel Type A (i.e., low-alloy steels) were quenched (quenching temperature: 880° C.) and tempered (tempering temperature: 650° C.), whereas the laser welded steel pipes indicated as Steel Type B (i.e., stainless steels) were treated by heat twice (heating temperature: 780° C. for the first treatment and 650° C. for the second treatment). Thereafter, both types of laser welded steel pipes were subjected to Charpy impact test according to JIS Standard Z2242. Test pieces were V-notched subsize test pieces in accordance with JIS Standard Z2202 and sampled from the seam. The test temperature was −60° C., at which the absorption energy $_vE_{-60}$ (J) was measured. Results are shown in Table 2.

As clearly seen in Table 2, examples of the present invention (Welded Steel Pipe Nos. 1 to 4) tested A: Excellent (⊙) or B: Good (○) in ultrasonic examination, and the absorption energy thereof measured in Charpy impact test (−60° C.) ranged from 82 to 112 J. On the other hand, comparative examples (Welded Steel Pipe Nos. 5 to 8) tested C: Acceptable (Δ) or D: Not acceptable (x) in ultrasonic examination, and the absorption energy thereof measured in Charpy impact test (−60° ranged from 8.7 to 38 J.

Therefore, the use of the present invention allows for stable laser welding even with an open pipe made of a thick material (one having a thickness of equal to or greater than 4 mm).

The seam of the laser welded steel pipes, in which the formation of welding defects and/or deposits was prevented as demonstrated by the results of ultrasonic examination, has an excellent corrosion resistance; it also has an excellent low-temperature toughness as demonstrated by the results of Charpy impact test.

Example 2

Laser welded steel pipes were manufactured by forming steel strips into cylindrical open pipes with forming rolls and then irradiating each open pipe with a laser beam 3 from the side of the outer surface while compressing the longitudinal edges 2 of the open pipe 1 using squeeze rolls. Additionally, a plasma jet or a TIG arc was used as an auxiliary heat source, and the auxiliary heat was so placed that they could heat the longitudinal edges 2 before the laser beam 3 did. Components of the steel strips were as shown in Table 3.

In laser welding, a 20-kW fiber laser oscillator was used, the power and welding speed of which were as shown in Table 4.

A monitoring device for the keyhole 4 was a monitoring camera 8 attached using the device shown in FIG. 3 to the mandrel bar 7 of a device for cutting inner beads, and was inserted into each open pipe 1. Note that the plasma illumination sensor 10 and the monitoring device 17 for it were not used, although shown in FIG. 3. The monitoring camera 8 was a camera that could visualize the predefined wavelength (i.e., 337 nm) only, in order to prevent disturbance due to light such as plasma illuminations generated by irradiation with the laser beam.

Examples of the present invention shown in Table 4 (Welded Steel Pipe Nos. 1 to 4) are examples in which the open pipe was heated and molten by the plasma jet or the TIG arc from the side of the outer surface thereof, and then a keyhole was monitored from the side of the inner surface of the open pipe with irradiation with the laser beam ongoing, the size of the keyhole was adjusted as shown in Table 4, and the positional relationship between the contact point of the longitudinal edges and the keyhole or molten metal was adjusted as shown in Table 4. Welded Steel Pipe Nos. 5 and 6, which are also examples of the present invention, are examples in which no auxiliary heat source was used.

Adjustment was made in such a manner that when the keyhole diameter was smaller than 0.2 mm, the irradiation point of the laser beam was moved in the circumferential direction of the open pipe 1 so that the contact point C of the longitudinal edges 2 could be located at the irradiation point of the laser beam 3 (the keyhole 4) or in molten metal 5.

The obtained laser welded steel pipes were subjected to ultrasonic examination, in which the seam was examined over 20 m of its length in accordance with JIS Standard G0582. Results of the examination are shown in Table 4. Note that in Table 4, defects were evaluated on the basis of the peak indicated height relative to the standard artificial defect, an N5 notch on the inner and outer surfaces, in accordance with the following criteria: the relative peak indicated height was equal to or lower than 10%—A: Excellent (⊙); higher than 10% but not higher than 25%—B: Good (○); higher than 25% but not higher than 50%—C: Acceptable (Δ); higher than 50%—D: Not acceptable (x). Visual inspections of the steel pipes for inner beads were also performed.

As clearly seen in Table 4, examples of the present invention (Welded Steel Pipe Nos. 1 to 4) tested A: Excellent (⊙) or B: Good (○) in ultrasonic examination. Also, the appearance of inner beads of the steel pipes was favorable. On the other hand, the examples of the present invention in which no auxiliary heat source was used (Welded Steel Pipe Nos. 5 and 6) tested B: Good (○) in ultrasonic examination; however, burn-through and undercutting were found in inner beads of the steel pipes.

Therefore, the use of the present invention allows for stable laser welding even with an open pipe made of a thick material (one having a thickness of equal to or greater than 4 mm).

Example 3

Laser welded steel pipes were manufactured by forming steel strips into cylindrical open pipes with forming rolls and then irradiating each open pipe with a laser beam from the side of the outer surface while compressing the longitudinal edges of the open pipe using squeeze rolls. Additionally, a TIG arc was used as auxiliary heating means, and the arc was so placed that it could heat and melt the longitudinal edges before the laser beam did. Components of the steel strips were as shown in Table 5.

In laser welding, a 10-kW fiber laser oscillator was used, the power and welding speed of which were as shown in Table 6.

A monitoring device for the keyhole was a monitoring camera 8 attached using the device shown in FIG. 3 to the mandrel bar 7 of a device for cutting inner beads, and was inserted into each open pipe 1. Note that the plasma illumination sensor 10 and the monitoring device 17 for it were not used, although shown in FIG. 3. The monitoring camera 8 was a camera that could visualize the predefined wavelength (i.e., 337 nm) only, in order to prevent, disturbance due to light such as plasma illuminations generated by irradiation with the laser beam.

Examples of the present invention shown in Table 6 (Welded Steel Pipe Nos. 1 to 4) are examples in which the open pipe was heated and molten by the TIG arc from the side of the outer surface thereof, and then a keyhole was monitored from the side of the inner surface of the open pipe with irradiation with the laser beam ongoing, the size of the keyhole was adjusted as shown in Table 6, and the positional relationship between the contact point of the longitudinal edges and the keyhole or molten metal was adjusted as shown in Table 6. Welded Steel Pipe Nos. 5 to 8, which are also examples of the present invention, are examples in which the TIG arc was not used.

Adjustment was made in such a manner that when the keyhole diameter was smaller than 0.2 mm, the irradiation point of the laser beam was moved in the circumferential direction of the open pipe 1 so that the contact point C of the longitudinal edges 2 could be located at the irradiation point of the laser beam 3 (the keyhole 4) or in molten metal 5.

The obtained laser welded steel pipes were subjected to ultrasonic examination, in which the seam was examined over 20 m of its length in accordance with JIS Standard G0582. Results of the examination are shown in Table 6. Note that in Table 6, defects were evaluated on the basis of the peak indicated height relative to the standard artificial defect, an N5 notch on the inner and outer surfaces, in accordance with the following criteria: the relative peak indicated height was equal to or lower than 10%—A: Excellent (⊙); higher than 10% but not higher than 25%—B: Good (○); higher than 25% but not higher than 50%—C: Acceptable (Δ); higher than 50%—D: Not acceptable (x). Visual inspections of the steel pipes for inner beads were also performed.

As clearly seen in Table 6, examples of the present invention (Welded Steel Pipe Nos. 1 to 4) tested A: Excellent (⊙) or B: Good (○) in ultrasonic examination. Also, the appearance of inner beads of the steel pipes was favorable. On the other hand, the examples of the present invention in which the TIC arc was not used (Welded Steel Pipe Nos. 5 to 8) tested B: Good (○) in ultrasonic examination; however, burn-through and undercutting were found in inner beads of the steel pipes.

Therefore, the use of the present invention allows for stable laser welding even with an open pipe made of a thick material (one having a thickness of equal to or greater than 4 mm).

Example 4

Laser welded steel pipes were manufactured by forming steel strips into cylindrical open pipes with forming rolls and then irradiating each open pipe with laser beam(s) (two beams or one beam) from the side of the outer surface while compressing the longitudinal edges of the open pipe using squeeze rolls. Components of the steel strips were as shown in Table 7. In laser welding, 5-kW and 10-kW fiber laser oscillators were used, the welding conditions of which were as shown in Table 8.

A monitoring device for keyholes was a monitoring camera 8 attached using the device shown in FIG. 3 to the mandrel bar 7 of a device for cutting inner beads, and was inserted into each open pipe. Note that the plasma illumination sensor 10 and the monitoring device 17 for it were not used, although shown in FIG. 3. The monitoring camera 8 was a camera that could visualize the predefined wavelength (i.e., 337 nm) only, in order to prevent disturbance due to light such as plasma illuminations generated by irradiation with the laser beam(s).

Examples of the present invention shown in Table 8 (Welded Steel Pipe Nos. 1 to 4) are examples in which the open pipe was irradiated with two laser beams from the side of the outer surface thereof to have two keyholes formed thereon, and the keyholes were monitored from the side of the inner surface of the open pipe, the sizes of the keyholes were adjusted as shown in Table 8, and the positional relationship between the contact point of the longitudinal edges and the keyholes or molten metal was adjusted as shown in Table 8. Welded Steel Pipe Nos. 5 to 8, which are also examples of the present invention, are examples in which the open pipe was irradiated with one laser beam to have one keyhole formed.

Adjustment was made in such a manner that when at least one keyhole diameter was smaller than 0.1 mm, the irradiation points and focusing points of the laser beams were moved in the circumferential direction of the open pipe 1 so that the contact point C of the longitudinal edges 2 could be located between the two keyholes and at the irradiation points of the laser beams 3 (the keyholes 4) or in molten metal 5.

The obtained laser welded steel pipes were subjected to ultrasonic examination, in which the seam was examined over 20 m of its length in accordance with JIS Standard G0582. Results of the examination are shown in Table 8. Note that in Table 8, defects were evaluated on the basis of the peak indicated height relative to the standard artificial defect, an N5 notch on the inner and outer surfaces, in accordance with the following criteria: the relative peak indicated height was equal to or lower than 10%—A: Excellent (⊙); higher than 10% but not higher than 25%—B: Good (○); higher than 25% but not higher than 50%—C: Acceptable (Δ); higher than 50%—D: Not acceptable (x). Visual inspections of the steel pipes for inner beads were also performed.

As clearly seen in Table 8, examples of the present invention (Welded Steel Pipe Nos. 1 to 4) tested A: Excellent (⊙) or B: Good (○) in ultrasonic examination. Also, the appearance of inner beads of the steel pipes was favorable. On the other hand, the examples of the present invention in which the open pipe was irradiated with one laser beam to have one keyhole formed (Welded Steel Pipe Nos. 5 to 8) tested B: Good (○) in ultrasonic examination; however, undercutting was found in inner beads of the steel pipes.

Therefore, the use of the present invention allows for stable laser welding even with an open pipe made of a thick material (one having a thickness of equal to or greater than 4 mm).

Example 5

Laser welded steel pipes were manufactured by forming steel strips into cylindrical open pipes with forming rolls and then irradiating each open pipe with a laser beam from the side of the outer surface while compressing the longitudinal edges of the open pipe using squeeze rolls. Additionally, a TIG arc was used as auxiliary heating means, and the arc was so placed that it could heat and melt the longitudinal edges before the laser beam did. Components of the steel strips were as shown in Table 9.

In laser welding, a 20-kW fiber laser oscillator was used, the power and welding speed of which were as shown in Table 10.

A monitoring device for the keyhole was a monitoring camera 8 attached using the device shown in FIG. 3 to the mandrel bar 7 of a device for cutting inner beads, and was inserted into each open pipe 1. The monitoring camera 8 was a camera that could visualize the predefined wavelength (i.e., 337 nm) only, in order to prevent disturbance due to light such as plasma illuminations generated by irradiation with the laser beam 3.

Additionally, a sensor 15 for the ray of reflected light generated from the irradiation point of the laser beam 3 was attached to a welding head 14 using the device shown in FIG. 5, and a sensor 10 for the plasma illumination was attached to the mandrel bar 7 using the device shown in FIG. 3.

Welded Steel Pipe Nos. 1 and 2, two of the examples of the present invention shown in Table 10, are examples in which a keyhole was monitored and the intensity of a plasma illumination was measured from the side of the inner surface of the open pipe using the device shown in FIG. 3, and the intensity of a ray of reflected light was measured from the side of the outer surface using the device shown in FIG. 5, and then the positional relationship between the contact point of the longitudinal edges and the keyhole or molten metal was adjusted as shown in Table 10 on the basis of the size of the keyhole, fluctuations on a relative value basis the measurement for the ray of reflected light, and fluctuations on a relative value basis of the measurement for the plasma illumination. Adjustment was made in such a manner that when the keyhole diameter was smaller than 0.2 mm, the irradiation point of the laser beam was moved in the circumferential direction of the open pipe 1 so that the contact point C of the longitudinal edges 2 could be located at the irradiation point of the laser beam 3 (the keyhole 4) or in molten metal 5.

Further, adjustment was made in such a manner that when fluctuations in the intensity of the plasma illuminations or in the intensity of the rays of reflected lights exceeded 15% on a relative value basis, the irradiation point of the laser beam was moved in the circumferential direction of the open pipe 1 so that the contact point C of the longitudinal edges 2 could be located at the irradiation point of the laser beam 3 (the keyhole 4) or in molten metal 5. Welded Steel Pipe Nos. 3 and 4 are examples in which the open pipe was heated and molten by a TIG arc from the side of the outer surface thereof, and then, with irradiation with the laser beam ongoing, a keyhole was monitored and the intensity of a plasma illumination was measured from the side of the inner surface of the open pipe, and the intensity of a ray of reflected light was measured from the side of the outer surface, and then the positional relationship between the contact point of the longitudinal edges and the keyhole or molten metal was adjusted as shown in Table 10 on the basis of the size of the keyhole, fluctuations on a relative value basis of the measurement for the ray of reflected light, and fluctuations on a relative value basis of the measurement for the plasma illumination.

Adjustment was made in such a manner that when fluctuations in the intensity of the plasma illumination or fluctuations in the intensity of the ray of reflected light exceeded 15% on a relative value basis, the irradiation point of the laser beam was moved in the circumferential direction of the open pipe 1 so that the contact point C of the longitudinal edges 2 could be located at the irradiation point of the laser beam 3 (the keyhole 4) or in molten metal 5.

Examples of the present invention (Welded Steel Pipe Nos. 5 to 8) are examples in which the ray of reflected light and the plasma illumination were not measured, and thus not reflected in adjustment of the positional relationship between the contact point of the longitudinal edges and the keyhole or molten metal even if fluctuations in the intensity of the plasma illumination or in the intensity of the ray of reflected light had exceeded 15% on a relative value basis.

The obtained laser welded steel pipes were subjected to ultrasonic examination, in which the seam was examined over 20 m of its length in accordance with JIS Standard G0582. Results of the examination are shown in Table 10. Note that in Table 10, defects were evaluated on the basis of the peak indicated height relative to the standard artificial defect, an N5 notch on the inner and outer surfaces, in accordance with the following criteria: the relative peak indicated height was equal to or lower than 10%—A: Excellent (⊙); higher than 10% but not higher than 25%—B: Good (○); higher than 25% but not higher than 50%—C: Acceptable (Δ); higher than 50%—D: Not acceptable (x). Visual inspections of the steel pipes for inner beads were also performed.

As clearly seen in Table 10, examples of the present invention (Welded Steel Pipe Nos. 1 to 4) tested A: Excellent (⊙) or B: Good (○) in ultrasonic examination. Also, the appearance of inner beads of the steel pipes was favorable. On the other hand, the examples of the present invention in which the ray of reflected light and the plasma illumination were not measured, and thus not reflected in adjustment of the positional relationship between the contact point of the longitudinal edges and the keyhole or molten metal even if fluctuations in the intensity of the plasma illumination or in the intensity of the ray of reflected light had exceeded 15% on a relative value basis (Welded Steel Pipe Nos. 5 to 8) tested favorable in ultrasonic examination; however, a short-time closed state of the keyhole occurred frequently, and spatters had formed in the vicinity of inner beads of the steel pipes. Also, in examples of the present invention (Welded Steel Pipe Nos. 5 and 6), burn-through and undercutting were found in inner beads of the steel pipes. Incidentally, the presence or absence of the closed state of the keyhole was confirmed by imaging the keyhole at 1000 frames per second after replacing the monitoring camera shown in FIG. 3 (30 frames/sec), which were used in Examples 1 to 4, with a high-speed camera. Any closed state of the keyhole lasting for 0.01 seconds or longer was regarded as the presence of a closed state. It was found that fluctuations in the intensity of the plasma illumination and those in the intensity of the ray of reflected light, and short-time closed states of the keyhole lasting for 0.01 seconds occurred almost synchronously.

Therefore, the use of the present invention allows for stable laser welding even with an open pipe made of a thick material (one having a thickness of equal to or greater than 4 mm).

Example 6

Laser welded steel pipes (outer diameter: 273.0 mm; thickness: 6.4 mm) were manufactured by forming steel strips into cylindrical open pipes 1 with forming rolls and then irradiating each open pipe 1 with laser beam(s) 3 (two beams or one beam) from the side of the outer surface while compressing the longitudinal edges 2 of the open pipe 1 using squeeze rolls. Additionally, a TIG arc was used as auxiliary heating means, and the arc 19 was so placed that it could heat and melt the longitudinal edges 2 before the laser beam 3 did. Components of the steel strips were as shown in Table 11.

In laser welding, 10-kW and 20-kW fiber laser oscillators were used, the welding conditions of which were as shown in Table 12.

A monitoring device for keyholes 4 was a monitoring camera 8 attached using the device shown in FIG. 3 to the mandrel bar 7 of a device for cutting inner beads, and was inserted into each open pipe 1. The monitoring camera 8 was a camera that could visualize the predefined wavelength (i.e., 337 nm) only, in order to prevent disturbance due to light such as plasma illuminations generated by irradiation with the laser beam(s) 3.

Additionally, a sensor 15 for ray(s) of reflected light generated from the irradiation point(s) of the laser beam(s) was attached to a welding head 14 as shown in FIG. 5, and a sensor 10 for plasma illumination(s) was attached to the mandrel bar 7 as shown in FIG. 3.

Welded Steel Pipes Nos. 1 and 2, two of the examples of the present invention shown in Table 12, are examples in which, with the open pipe irradiated with two laser beams, keyholes 4 were monitored and the intensity of plasma illuminations was measured from the side of the inner surface of the open pipe using the device shown in FIG. 3, and the intensity of rays of reflected light was measured from the side of the outer surface using the device shown in FIG. 5, and then the positional relationship between the contact point of the longitudinal edges and the keyholes or molten metal was adjusted as shown in Table 12 on the basis of the size of the keyholes 4, fluctuations on a relative value basis of the measurements for the rays of reflected light, and fluctuations on a relative value basis of the measurements for the plasma illuminations. Adjustment was made in such a manner that when at least one keyhole diameter was smaller than 0.1 mm, the irradiation points and focusing points of the laser beams were moved in the circumferential direction of the open pipe 1 so that the contact point C of the longitudinal edges 2 could be located between the two keyholes and at the irradiation points of the laser beams 3 (the keyholes 4) or in molten metal 5.

Further, adjustment was made in such a manner that when fluctuations in the intensity of the plasma illuminations or in the intensity of the rays of reflected light exceeded 15% on a relative value basis, the irradiation points and focusing points of the laser beams were moved in the circumferential direction of the open pipe 1 so that the contact point C of the longitudinal edges 2 could be located between the two keyholes and at the irradiation points of the laser beams 3 (the keyholes 4) or in molten metal 5.

Welded Steel Pipe Nos. 3 and 4 are examples in which the open pipe was heated and molten by a TIG arc from the side of the outer surface thereof, and then, with irradiation ongoing with two laser streams obtained by splitting a laser beam 3 in the optical system used, keyholes 4 were monitored and the intensity of plasma illuminations was measured from the side of the inner surface of the open pipe 1, and the intensity of rays of reflected light was measured from the side of the outer surface, and then the positional relationship between the contact point C of the longitudinal edges 2 and the keyholes 4 or molten metal 5 was adjusted as shown in Table 12 on the basis of the sizes of the keyholes 4, fluctuations on a relative value basis of the measurements for the rays of reflected light, and fluctuations on a relative value basis of the measurements for the plasma illuminations. Adjustment was made in such a manner that when at least one keyhole diameter was smaller than 0.1 mm, the irradiation points and focusing points of the laser beams were moved in the circumferential direction of the open pipe 1 so that the contact point C of the longitudinal edges 2 could be located between the two keyholes and at the irradiation points of the laser beams 3 (the keyholes 4) or in molten metal 5. Further, adjustment was made in such a manner that when fluctuations in the intensity of the plasma illuminations or in the intensity of the rays of reflected light exceeded 15% on a relative value basis, the irradiation points and focusing points of the laser beams were moved in the circumferential direction of the open pipe 1 so that the contact point C of the longitudinal edges 2 could be located between the two keyholes and at the irradiation points of the laser beams 3 (the keyholes 4) or in molten metal 5.

Examples of the present invention (Welded Steel Pipe Nos. 5 to 8) are examples in which the rays of reflected light and the plasma illuminations were not measured, and thus not reflected in adjustment of the positional relationship between the contact point C of the longitudinal edges 2 and the keyholes 4 or molten metal 5 even if fluctuations in the intensity of the plasma illuminations or in the intensity of the rays of reflected light had exceeded 15% on a relative value basis.

The obtained laser welded steel pipes were subjected to ultrasonic examination, in which the seam was examined over 20 m of its length in accordance with JIS Standard G0582. Results of the examination are shown in Table 12. Note that in Table 12, defects were evaluated on the basis of the peak indicated height relative to the standard artificial defect, an N5 notch on the inner and outer surfaces, in accordance with the following criteria: the relative peak indicated height was equal to or lower than 10%—A: Excellent (⊙); higher than 10% but not higher than 25%—B: Good (○); higher than 25% but not higher than 50%—C: Acceptable (△); higher than 50%—D: Not acceptable (x). Visual inspections of the steel pipes for inner beads were also performed.

As clearly seen in Table 12, examples of the present invention (Welded Steel Pipe Nos. 1 to 4) tested A: Excellent (⊙) or B: Good (○) in ultrasonic examination. Also, the appearance of inner beads of the steel pipes was favorable. On the other hand, the examples of the present invention in which the rays of reflected light and the plasma illuminations were not measured, and thus not reflected in adjustment of the positional relationship between the contact point C of the longitudinal edges 2 and the keyholes 4 or molten metal 5 even if fluctuations in the intensity of the plasma illuminations or in the intensity of the rays of reflected light had exceeded 15% on a relative value basis (Steel Pipe Nos. 5 to 8) tested favorable in ultrasonic examination; however, a short-time closed state of the keyholes occurred frequently, and spatters had formed in the vicinity of inner beads of the steel pipes. Also, in examples of the present invention (Welded Steel Pipe Nos. 5 and 6), burn-through and undercutting were found in inner beads of the steel pipes. Incidentally, the presence or absence of the closed state of the keyholes was confirmed by imaging the keyholes at 1000 frames per second after replacing the monitoring camera shown in FIG. 3 (30 frames/sec), which were used in Examples 1 to 4, with a high-speed camera. Any closed state of the keyhole lasting for 0.01 seconds or longer was regarded as the presence of a closed state. It was found that fluctuations in the intensity of the plasma illuminations and those in the intensity of the rays of reflected light, and short-time closed states of the keyholes lasting for 0.01 seconds occurred almost synchronously.

Therefore, the use of the present invention allows for stable laser welding even when the open pipe 1 is made of a thick material (one having a thickness of equal to or greater than 4 mm).

The status of laser welding can be accurately assessed during the manufacturing of laser welded steel pipes by monitoring of keyhole(s) 4 and optionally measuring ray(s) of reflected light and plasma illumination(s), so that the contact point C of the longitudinal edges 2 can be always located in the keyhole(s) 4 or molten metal 5 formed by irradiation with laser beam(s) 3. As a result, laser welded steel pipes can be manufactured at a high yield rate and in a stable manner. In this way, the present invention has a profound benefit to industry.

TABLE 1

| Steel type | Components (mass %) | | | | | | | | | | | |
|---|---|---|---|---|---|---|---|---|---|---|---|---|
| | C | Si | Mn | P | S | Cr | Ni | Cu | Al | Ti | N | Balance |
| A | 0.05 | 0.2 | 1.4 | 0.01 | 0.004 | — | — | 0.04 | 0.04 | 0.035 | 0.003 | Fe and unavoidable impurities |
| B | 0.01 | 0.18 | 0.31 | 0.01 | 0.002 | 12.65 | 2.85 | 0.15 | 0.025 | 0.014 | 0.01 | Fe and unavoidable impurities |

TABLE 3

| Steel type | Components (mass %) | | | | | | | | | | | |
|---|---|---|---|---|---|---|---|---|---|---|---|---|
| | C | Si | Mn | P | S | Cr | Ni | Cu | Al | Ti | N | Balance |
| A | 0.06 | 0.29 | 1.71 | 0.011 | 0.003 | — | — | 0.03 | 0.032 | 0.031 | 0.003 | Fe and unavoidable impurities |
| B | 0.01 | 0.18 | 0.27 | 0.01 | 0.002 | 12.8 | 2.8 | 0.15 | 0.023 | 0.014 | 0.01 | Fe and unavoidable impurities |

TABLE 2

| Welded steel pipe No | Steel type | Dimensions of the welded steel pipe | | Welding conditions | | | | |
|---|---|---|---|---|---|---|---|---|
| | | Outer diameter (mm) | Thickness (mm) | Welding speed (m/min) | Laser power (kW) | Monitoring | Keyhole(s) Diameter (inner surface side) | Position of the contact point of the longitudinal edges |
| 1 | A | 323 | 8 | 9 | 22 | Yes | ≥0.5 mm | Inside the keyhole(s) |
| 2 | A | 323 | 8 | 9 to 10 | 23 | Yes | ≥0.3 mm | Inside molten metal |
| 3 | B | 273 | 6.4 | 10 | 20 | Yes | ≥0.2 mm | Inside molten metal |
| 4 | B | 273 | 6.4 | 10 to 11 | 22 | Yes | ≥0.3 mm | Inside the keyhole(s) |
| 5 | A | 323 | 8 | 9 | 22 | No | — | — |
| 6 | A | 323 | 8 | 9 to 10 | 22 | No | — | — |
| 7 | B | 273 | 6.4 | 10 | 19 | Yes | ≥0.3 mm | Outside molten metal |
| 8 | B | 273 | 6.4 | 10 to 11 | 21 | Yes | Closed state found | Inside molten metal |

| Welded steel pipe No | Ultrasonic examination* Result | Charpy test* | | Remarks |
|---|---|---|---|---|
| | | $vE_{-60}$ (J) | Size of the test piece (mm) | |
| 1 | A⊙ | 112 | 5 | Examples |
| 2 | A⊙ | 91 | 5 | |
| 3 | B○ | 82 | 5 | |
| 4 | A⊙ | 108 | 5 | |

TABLE 2-continued

| | | | | |
|---|---|---|---|---|
| 5 | CA | 27 | 5 | Comparative examples |
| 6 | DX | 14 | 5 | |
| 7 | DX | 8.7 | 5 | |
| 8 | CA | 38 | 5 | |

*Seam

TABLE 4

| | | Dimensions of the welded steel pipe | | Welding conditions | | | | Keyhole(s) | |
|---|---|---|---|---|---|---|---|---|---|
| Welded steel pipe No | Steel type | Outer diameter (mm) | Thickness (mm) | Welding speed (m/min) | Laser power (kW) | Auxiliary heat source | Monitoring | | Diameter (inner surface side) |
| 1 | A | 323 | 8 | 10 | 20 | Plasma jet | Yes | | ≥0.2 mm |
| 2 | A | 323 | 8 | 10 | 20 | TIG arc | Yes | | ≥0.2 mm |
| 3 | B | 273 | 7.5 | 8 | 20 | Plasma jet | Yes | | ≥0.4 mm |
| 4 | B | 273 | 7.5 | 8 | 20 | TIG arc | Yes | | ≥0.4 mm |
| 5 | A | 323 | 8 | 10 | 20 | None | Yes | | ≥0.2 mm |
| 6 | B | 273 | 7.5 | 8 | 20 | None | Yes | | ≥0.4 mm |

| Welded steel pipe No | Welding conditions Position of the contact point of the longitudinal edges | Ultrasonic examination* Result | Appearance of inner beads of the steel pipe | Remarks |
|---|---|---|---|---|
| 1 | Inside molten metal | A⊙ | Favorable | Examples |
| 2 | Inside molten metal | A⊙ | Favorable | |
| 3 | Inside molten metal | A⊙ | Favorable | |
| 4 | Inside molten metal | B○ | Favorable | |
| 5 | Inside molten metal | B○ | Undercutting and burn-through found | Examples |
| 6 | Inside molten metal | B○ | Undercutting and burn-through found | |

*Seam

TABLE 5

| Steel type | Components (mass %) | | | | | | | | | | |
|---|---|---|---|---|---|---|---|---|---|---|---|
| | C | Si | Mn | P | S | Cr | Ni | Cu | Al | Ti | N | Balance |
| A | 0.05 | 0.21 | 1.52 | 0.01 | 0.004 | — | — | 0.04 | 0.035 | 0.039 | 0.003 | Fe and unavoidable impurities |
| B | 0.01 | 0.16 | 0.29 | 0.01 | 0.002 | 12.7 | 2.9 | 0.15 | 0.024 | 0.015 | 0.011 | Fe and unavoidable impurities |

TABLE 7

| Steel type | Components (mass %) | | | | | | | | | | |
|---|---|---|---|---|---|---|---|---|---|---|---|
| | C | Si | Mn | P | S | Cr | Ni | Cu | Al | Ti | N | Balance |
| A | 0.05 | 0.26 | 1.62 | 0.01 | 0.003 | — | — | 0.04 | 0.032 | 0.035 | 0.003 | Fe and unavoidable impurities |

TABLE 7-continued

| Steel type | Components (mass %) | | | | | | | | | | | Balance |
|---|---|---|---|---|---|---|---|---|---|---|---|---|
| | C | Si | Mn | P | S | Cr | Ni | Cu | Al | Ti | N | |
| B | 0.01 | 0.15 | 0.25 | 0.011 | 0.002 | 12.7 | 3 | 0.17 | 0.027 | 0.016 | 0.009 | Fe and unavoidable impurities |

TABLE 6

| | | Dimensions of the welded steel pipe | | Welding conditions | | | | Keyhole(s) | |
|---|---|---|---|---|---|---|---|---|---|
| Welded steel pipe No | Steel type | Outer diameter (mm) | Thickness (mm) | Welding speed (m/min) | Laser power (kW) | Heating with a TIG arc | Monitoring | | Diameter (inner surface side) |
| 1 | A | 273 | 6.4 | 5 | 10 | Yes | Yes | | ≥0.2 mm |
| 2 | A | 273 | 6.4 | 3 | 10 | Yes | Yes | | ≥0.4 mm |
| 3 | B | 273 | 6.4 | 5 | 10 | Yes | Yes | | ≥0.2 mm |
| 4 | B | 273 | 6.4 | 3 | 10 | Yes | Yes | | ≥0.4 mm |
| 5 | A | 273 | 6.4 | 5 | 10 | No | Yes | | ≥0.2 mm |
| 6 | A | 273 | 6.4 | 3 | 10 | No | Yes | | ≥0.4 mm |
| 7 | B | 273 | 6.4 | 5 | 10 | No | Yes | | ≥0.2 mm |
| 8 | B | 273 | 6.4 | 3 | 10 | No | Yes | | ≥0.4 mm |

| Welded steel pipe No | Welding conditions Position of the contact point of the longitudinal edges | Ultrasonic examination* Result | Appearance of inner beads of the steel pipe | Remarks |
|---|---|---|---|---|
| 1 | Inside molten metal | A⊙ | Favorable | Examples |
| 2 | Inside molten metal | B○ | Favorable | |
| 3 | Inside molten metal | A⊙ | Favorable | |
| 4 | Inside molten metal | B○ | Favorable | |
| 5 | Inside molten metal | B○ | Undercutting and burn-through found | Examples |
| 6 | Inside molten metal | B○ | Undercutting and burn-through found | |
| 7 | Inside molten metal | B○ | Undercutting and burn-through found | |
| 8 | Inside molten metal | B○ | Undercutting and burn-through found | |

*Seam

TABLE 8

| | | Dimensions of the steel pipe | | Welding conditions | | | Keyhole(s) | |
|---|---|---|---|---|---|---|---|---|
| Welded steel pipe No | Steel type | Outer diameter (mm) | Thickness (mm) | Welding speed (m/min) | Laser power (kW) | Irradiation with laser | Monitoring | Diameter (inner surface side) |
| 1 | A | 273 | 6.4 | 5 | 5 kW × 2 lasers | Two 5-kW beams | Yes | ≥0.1 mm |
| 2 | A | 273 | 6.4 | 3 | 10 kW × 1 laser | One 10-kW beam split into two in the optical system | Yes | ≥0.2 mm |
| 3 | B | 273 | 6.4 | 5 | 5 kW × 2 lasers | Two 5-kW beams | Yes | ≥0.1 mm |

TABLE 8-continued

| | | | | | | | | |
|---|---|---|---|---|---|---|---|---|
| 4 | B | 273 | 6.4 | 3 | 10 kW × 1 laser | One 10-kW beam split into two in the optical system | Yes | ≥0.2 mm |
| 5 | A | 273 | 6.4 | 5 | 10 kW × 1 laser | One 10-kW beam | Yes | ≥0.2 mm |
| 6 | A | 273 | 6.4 | 3 | 10 kW × 1 laser | One 10-kW beam | Yes | ≥0.4 mm |
| 7 | B | 273 | 6.4 | 5 | 10 kW × 1 laser | One 10-kW beam | Yes | ≥0.2 mm |
| 8 | B | 273 | 6.4 | 3 | 10 kW × 1 laser | One 10-kW beam | Yes | ≥0.4 mm |

| Welded steel pipe No | Position of the contact point of the longitudinal edges | Ultrasonic examination Result | Appearance of inner beads of the steel pipe | Remarks |
|---|---|---|---|---|
| 1 | Between two keyholes, inside molten metal | A⊙ | Favorable | Examples |
| 2 | Between two keyholes, inside molten metal | B○ | Favorable | |
| 3 | Between two keyholes, inside molten metal | A⊙ | Favorable | |
| 4 | Between two keyholes, inside molten metal | A⊙ | Favorable | |
| 5 | Inside molten metal | B○ | Undercutting found | Examples |
| 6 | Inside molten metal | B○ | Undercutting found | |
| 7 | Inside molten metal | B○ | Undercutting found | |
| 8 | Inside molten metal | B○ | Undercutting found | |

* Seam

TABLE 9

| Steel type | Components (mass %) | | | | | | | | | | | |
|---|---|---|---|---|---|---|---|---|---|---|---|---|
| | C | Si | Mn | P | S | Cr | Ni | Cu | Al | Ti | N | Balance |
| A | 0.05 | 0.22 | 1.53 | 0.01 | 0.003 | — | — | 0.05 | 0.034 | 0.038 | 0.004 | Fe and unavoidable impurities |
| B | 0.01 | 0.15 | 0.28 | 0.01 | 0.002 | 12.8 | 2.9 | 0.14 | 0.025 | 0.016 | 0.011 | Fe and unavoidable impurities |

TABLE 11

| Steel type | Components (mass %) | | | | | | | | | | | |
|---|---|---|---|---|---|---|---|---|---|---|---|---|
| | C | Si | Mn | P | S | Cr | Ni | Cu | Al | Ti | N | Balance |
| A | 0.06 | 0.3 | 2.05 | 0.008 | 0.002 | — | — | 0.15 | 0.026 | 0.024 | 0.004 | Fe and unavoidable impurities |
| B | 0.01 | 0.16 | 0.24 | 0.01 | 0.002 | 12.8 | 2.9 | 0.2 | 0.015 | 0.03 | 0.012 | Fe and unavoidable impurities |

TABLE 10

| Welded steel pipe No | Steel type | Dimensions of the steel pipe | | Welding conditions | | | | | | Keyhole diameter (inner surface side) |
|---|---|---|---|---|---|---|---|---|---|---|
| | | Outer diameter (mm) | Thickness (mm) | Welding speed (m/) | Laser power (kW | Heating with a TIC arc | Monitoring of keyhole(s) | Monitoring of ray(s) of reflected right | Monitoring of plasma illumination(s) | |
| 1 | A | 273 | 6.4 | 10 | 20 | No | Yes | Yes | Yes | ≥0.2 mm |
| 2 | B | 273 | 6.4 | 10 | 20 | No | Yes | Yes | Yes | ≥0.2 mm |
| 3 | A | 273 | 6.4 | 10 | 20 | Yes | Yes | Yes | Yes | ≥0.2 mm |
| 4 | B | 273 | 6.4 | 10 | 20 | Yes | Yes | Yes | Yes | ≥0.2 mm |
| 5 | A | 273 | 6.4 | 10 | 20 | No | Yes | No | No | ≥0.2 mm |
| 6 | B | 273 | 6.4 | 10 | 20 | No | Yes | No | No | ≥0.2 mm |
| 7 | A | 273 | 6.4 | 10 | 20 | Yes | Yes | No | No | ≥0.2 mm |
| 8 | B | 273 | 6.4 | 10 | 20 | Yes | Yes | No | No | ≥0.2 mm |

| Welded steel pipe No | Welding conditions | | Ultrasonic examination* Result | Appearance of inner beads of the steel pipe | Remarks |
|---|---|---|---|---|---|
| | Position of the contact point of the longitudinal edges | Closed state of keyhole(s) found | | | |
| 1 | Inside molten metal | No | B○ | Favorable | Examples |
| 2 | Inside molten metal | No | B○ | Favorable | |
| 3 | Inside molten metal | No | A⊙ | Favorable | |
| 4 | Inside molten metal | No | A⊙ | Favorable | |
| 5 | Inside molten metal | Yes | B○ | Many spatters, undercutting, and burn-through found | Examples |
| 6 | Inside molten metal | Yes | B○ | Many spatters and burn-through found | |
| 7 | Inside molten metal | Yes | B○ | Many spatters, undercutting, and burn-through found | |
| 8 | Inside molten metal | Yes | B○ | Many spatters and burn-through found | |

*Seam

TABLE 12

| Welded steel pipe No | Steel type | Welding conditions | | | | | | | Keyhole diameter (inner surface side) |
|---|---|---|---|---|---|---|---|---|---|
| | | Welding speed (m/min) | Laser power (kW) | Irradiation with laser | Heating with a TIC arc | Monitoring of keyhole(s) | Monitoring of ray(s) of reflected right | Monitoring of plasma illumination(s) | |
| 1 | A | 10 | 10 kW × 2 lasers | Two 10-kW beams | No | Yes | Yes | Yes | ≥0.1 mm |
| 2 | B | 10 | 10 kW × 2 lasers | Two 10-kW beams | No | Yes | Yes | Yes | ≥0.1 mm |
| 3 | A | 10 | 20 kW × 1 laser | One 20-kW beam split into two in the optical system | Yes | Yes | Yes | Yes | ≥0.1 mm |
| 4 | B | 10 | 20 kW × 1 laser | One 20-kW beam split into two in the optical system | Yes | Yes | Yes | Yes | ≥0.1 mm |
| 5 | A | 10 | 10 kW × 2 lasers | Two 10-kW beams | No | Yes | No | No | ≥0.1 mm |
| 6 | B | 10 | 10 kW × 2 lasers | Two 10-kW beams | No | Yes | No | No | ≥0.1 mm |
| 7 | A | 10 | 20 kW × 1 laser | One 20-kW beam split into two in the optical system | Yes | Yes | No | No | ≥0.1 mm |

TABLE 12-continued

| | | | | | | | | | |
|---|---|---|---|---|---|---|---|---|---|
| 8 | B | 10 | 20 kW × 1 laser | One 20-kW beam split into two in the optical system | Yes | Yes | No | No | ≥0.1 mm |

| | Welding conditions | | | | |
|---|---|---|---|---|---|
| Welded steel pipe No | Position of the contact point of the longitudinal edges | Closed state of keyhole(s) found | Ultrasonic examination* Result | Appearance of inner beads of the steel pipe | Remarks |
| 1 | Between two keyholes, inside molten metal | No | B○ | Favorable | Examples |
| 2 | Between two keyholes, inside molten metal | No | B○ | Favorable | |
| 3 | Between two keyholes, inside molten metal | No | A⊙ | Favorable | |
| 4 | Between two keyholes, inside molten metal | No | A⊙ | Favorable | |
| 5 | Inside molten metal | Yes | B○ | Many spatters, undercutting, and burn-through found | Examples |
| 6 | Inside molten metal | Yes | B○ | Many spatters, undercutting, and burn-through found | |
| 7 | Inside molten metal | Yes | B○ | Many spatters found | |
| 8 | Inside molten metal | Yes | B○ | Many spatters found | |

*

The invention claimed is:

1. A method for manufacturing a laser welded steel pipe in which a steel strip is formed into a cylindrical open pipe with a forming roll and then the longitudinal edge of the open pipe is welded by irradiating the outer surface of the open pipe with a laser beam while compressing the longitudinal edge of the open pipe with a squeeze roll, comprising:

a step of monitoring an irradiation point of the laser beam, with which the longitudinal edge is irradiated, from the side of the inner surface of the open pipe, and an assessment step in which conditions of welding with the laser beam are kept unchanged if a keyhole is found penetrating out of the inner surface of the open pipe, or modified if no keyhole is found penetrating out of the inner surface of the open pipe, so that welding can be performed with a keyhole penetrating from the outer surface to the inner surface of the open pipe captured at the irradiation point of the laser beam.

2. The method for manufacturing a laser welded steel pipe according to claim 1, wherein an auxiliary heat source is used for heating from the side of the outer surface so that the longitudinal edge can be further heated and molten, and for emitting the laser beam.

3. The method for manufacturing a laser welded steel pipe according to claim 2, wherein the auxiliary heat source is an arc.

4. The method for manufacturing a laser welded steel pipe according to claim 1, further comprising, besides the step of monitoring the irradiation point of the laser beam, with which the longitudinal edge is irradiated, from the side of the inner surface of the open pipe, a step of measuring a ray of reflected light and a plasma illumination both generated from the irradiation point by irradiation with the laser beam using sensors, wherein the assessment step is thus as follows: with the status of welding monitored on the basis of the individual measurements provided by the sensors, the conditions of welding with the laser beam are kept unchanged if a keyhole is found penetrating out of the inner surface of the open pipe and if fluctuations on a relative value basis of the measurement for the ray of reflected light and that for the plasma illumination are small, or modified if a keyhole is found penetrating out of the inner surface of the open pipe, instable, and repeatedly closing and if fluctuations on a relative value basis of the measurement for the ray of reflected light and that for the plasma illumination are large, so that welding can be performed with a keyhole penetrating from the outer surface to the inner surface of the open pipe captured at the irradiation point of the laser beam.

5. The method for manufacturing a laser welded steel pipe according to claim 1, wherein the size of the keyhole measured on the side of the inner surface of the open pipe is equal to or greater than 0.2 mm in diameter.

6. The method for manufacturing a laser welded steel pipe according to claim 1, wherein the contact point of the longitudinal edge, at which the squeeze roll compresses the longitudinal edge, is located in molten metal formed by irradiation with the laser beam.

7. The method for manufacturing a laser welded steel pipe according to claim 1, wherein the contact point of the longitudinal edge, at which the squeeze roll compresses the longitudinal edge, is located in the keyhole.

8. The method for manufacturing a laser welded steel pipe according to claim 2, wherein an oscillator of the laser beam and the auxiliary heat source are placed in integration.

9. The method for manufacturing a laser welded steel pipe according to claim 2, wherein an oscillator of the laser beam and the auxiliary heat source are placed in integration, and the auxiliary heat source heats the longitudinal edge before the laser beam does.

10. The method for manufacturing a laser welded steel pipe according to claim 3, wherein an oscillator of the laser beam is a fiber laser oscillator offering a laser power of higher than 15 kW and a laser focusing length equal to or longer than 200 mm.

11. The method for manufacturing a laser welded steel pipe according to claim 3, wherein the distance between the irradiation point of the laser beam and an electrode of the arc measured on the outer surface of the open pipe is equal to or shorter than 7 mm.

12. The method for manufacturing a laser welded steel pipe according to claim 4, wherein the ray of reflected light is measured from the side of the outer surface of the open pipe, whereas the plasma illumination is measured from the side of the inner surface of the open pipe.

13. The method for manufacturing a laser welded steel pipe according to claim 1, wherein the laser beam is a plurality of laser beams, and welding is performed with keyholes penetrating from the outer surface to the inner surface of the open pipe individually captured at the irradiation points of the laser beams.

14. The method for manufacturing a laser welded steel pipe according to claim 13, further comprising, besides the step of monitoring the irradiation points of the laser beams, with which the longitudinal edge is irradiated, from the side of the inner surface, a step of measuring rays of reflected light and plasma illuminations both generated from the irradiation points by irradiation with the laser beams using sensors, wherein the assessment step is thus as follows: with the status of welding monitored on the basis of the individual measurements provided by the sensors, the conditions of welding with the laser beams are kept unchanged if a plurality of keyholes are found penetrating out of the inner surface of the open pipe and if the relative values of the measurements for the rays of reflected light and those for the plasma illuminations are small, or modified if any keyhole is found penetrating out of the inner surface of the open pipe, instable, and repeatedly closing and if the relative values of the measurements for the rays of reflected light and those for the plasma illuminations are large, so that welding can be performed with any keyhole penetrating from the outer surface to the inner surface of the open pipe captured at any of the irradiation points of the laser beams.

15. The method for manufacturing a laser welded steel pipe according to claim 13, wherein the contact point of the longitudinal edge is located between two of the keyholes that are located across the longitudinal edge and whose distances to the longitudinal edge in the direction perpendicular to the longitudinal edge are longer than that of any other one of the keyholes.

16. The method for manufacturing a laser welded steel pipe according to claim 13, wherein the sizes of the keyholes measured on the side of the inner surface of the open pipe are all equal to or greater than 0.1 mm in diameter.

17. The method for manufacturing a laser welded steel pipe according to claim 13, wherein the contact point of the longitudinal edge is located in molten metal formed by irradiation with the laser beams.

18. The method for manufacturing a laser welded steel pipe according to claim 13, wherein the laser beams are two laser beams.

19. The method for manufacturing a laser welded steel pipe according to claim 13, wherein an auxiliary heat source is used for heating from the side of the outer surface so that the longitudinal edge can be further heated and molten.

* * * * *